UNITED STATES PATENT OFFICE.

HENRY BOWER, OF PHILADELPHIA, PENNSYLVANIA.

PROCESS OF MAKING PRUSSIATES.

SPECIFICATION forming part of Letters Patent No. 556,130, dated March 10, 1896.

Application filed June 25, 1895. Serial No. 554,028. (No specimens.)

*To all whom it may concern:*

Be it known that I, HENRY BOWER, a citizen of the United States, and a resident of the city and county of Philadelphia, State of Pennsylvania, have invented certain new and useful Improvements in the Manufacture of Prussiates, of which the following is a specification.

In an application for patent filed of even date herewith, Serial No. 554,027, I have described a method of obtaining and separating from gas-liquor sulfocyanid of iron, a product not hitherto produced commercially.

My invention relates to improvements in the manufacture of prussiates; and the object of my invention is to furnish a method for the conversion of sulfocyanids into prussiates.

I heat in a suitable vessel carbonate of potash, (or carbonate of soda,) iron, and animal matter, such as comminuted leather, horn, hoofs, or the like. as is done in the ordinary and well-known method of making prussiate of potash from carbonate of potash, or prussiate of soda from carbonate of soda, and then at any stage, but preferably toward the end of the operation, add to the mass in the vessel, from time to time, in small portions, sulfocyanid of iron, which may have been obtained by my process above referred to and in quantity sufficient to be entirely decomposed. The sulfocyanid is reduced to cyanid and mixes with the other materials in the vessel. After the operation of fusion is completed, the resulting melt contains cyanid of potassium, sulfid of potassium and sulfid of iron, and being removed from the vessel is cooled and lixiviated with water, whereupon from the resulting alkaline solution the prussiates are formed and are separated by crystallization in the well-known manner.

Having thus described my invention, what I claim, and desire to secure by Letters Patent, is—

The process of producing prussiate of potash or soda from sulfocyanid of iron, which consists in forming cyanid of potassium, adding to this the sulfocyanid during fusion, then cooling the mass, and lixiviating with water and crystallizing out the prussiates as and for the purpose described.

HENRY BOWER.

Witnesses:
 CHRISTOPHER FALLON,
 CHARLES A. RUTTER.